US011445391B2

(12) United States Patent
Chen et al.

(10) Patent No.: US 11,445,391 B2
(45) Date of Patent: Sep. 13, 2022

(54) METHOD AND APPARATUS FOR RADIO LINK MONITORING

(71) Applicant: FG Innovation Company Limited, Tuen Mun (HK)

(72) Inventors: Hung-Chen Chen, Taipei (TW); Mei-Ju Shih, Taipei (TW); Yung-Lan Tseng, Taipei (TW); Yu-Hsin Cheng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/992,526

(22) Filed: Aug. 13, 2020

(65) Prior Publication Data

US 2021/0051499 A1 Feb. 18, 2021

Related U.S. Application Data

(60) Provisional application No. 62/888,080, filed on Aug. 16, 2019.

(51) Int. Cl.

*H04W 24/08* (2009.01)
*H04W 28/02* (2009.01)
*H04W 80/08* (2009.01)
*H04W 76/19* (2018.01)
*H04L 5/00* (2006.01)

(52) U.S. Cl.

CPC ........... *H04W 24/08* (2013.01); *H04L 5/0051* (2013.01); *H04L 5/0082* (2013.01); *H04W 28/0236* (2013.01); *H04W 76/19* (2018.02); *H04W 80/08* (2013.01)

(58) Field of Classification Search

None

See application file for complete search history.

(56) References Cited

U.S. PATENT DOCUMENTS

2016/0262100 A1* 9/2016 Larsson ............ H04W 52/0206
2019/0081691 A1* 3/2019 Nagaraja ............. H04W 36/305
2019/0313411 A1* 10/2019 Ly ..................... H04W 72/0453

OTHER PUBLICATIONS

5G, Requirements for support of radio resource management—3GPP TS 38.133 version 15.3.0 Release 15 (Oct. 2018) (Year: 2018).*

* cited by examiner

*Primary Examiner* — Peter Chen
*Assistant Examiner* — Jeff Banthrongsack
(74) *Attorney, Agent, or Firm* — ScienBiziP, P.C.

(57) ABSTRACT

A method for radio link monitoring (RLM) performed by a user equipment (UE) is provided. The method includes: receiving, from a serving cell, an RLM configuration; monitoring an RLM reference signal (RS) (RLM-RS) resource indicated by the RLM configuration to determine a first downlink (DL) radio link quality; monitoring a backup RLM-RS resource that is associated with the RLM-RS resource to determine a second DL radio link quality after determining that the first DL radio link quality is lower than a threshold and the RLM configuration also indicates the backup RLM-RS resource; and sending, via a physical (PHY) layer of the UE, an RLM indication to a higher layer of the UE based on at least one of the first DL radio link quality and the second DL radio link quality.

18 Claims, 4 Drawing Sheets

300

302 Receive, from a serving cell, an RLM configuration

304 Monitor an RLM-RS resource indicated by the RLM configuration to determine a first DL radio link quality 306 Monitor a backup RLM-RS resource that is associated with the RLM-RS resource to determine a second DL radio link quality after determining that the first DL radio link quality is lower than a threshold and the RLM configuration also indicates the backup RLM-RS resource 308 Send, via a PHY layer of the UE, an RLM indication to a higher layer of the UE based on at least one of the first DL radio link quality and the second DL radio link quality

METHOD AND APPARATUS FOR RADIO LINK MONITORING

CROSS-REFERENCE TO RELATED APPLICATION(S)

The present disclosure claims the benefit of and priority of provisional U.S. Patent Application Ser. No. 62/888,080, filed on Aug. 16, 2019, entitled "Enhanced RLM and RLF Mechanisms for Operating on Unlicensed Spectrum" ("the '080 provisional"). The disclosure of the '080 provisional is hereby incorporated fully by reference into the present disclosure for all purposes.

FIELD

The present disclosure is related to wireless communication, and more particularly, to a method for radio link monitoring (RLM) in cellular wireless communication networks.

BACKGROUND

With the tremendous growth in the number of connected devices and the rapid increase in user/network traffic volume, various efforts have been made to improve different aspects of wireless communication for cellular wireless communication systems, such as fifth generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is related to a method for RLM in a cellular wireless communication network.

According to an aspect of the present disclosure, a user equipment (UE) is provided that includes one or more non-transitory computer-readable media containing computer-executable instructions embodied therein and at least one processor coupled to the one or more non-transitory computer-readable media. The at least one processor is configured to execute the computer-executable instructions to: receive, from a serving cell, an RLM configuration; monitor an RLM reference signal (RS) (RLM-RS) resource indicated by the RLM configuration to determine a first downlink (DL) radio link quality; monitor a backup RLM-RS resource that is associated with the RLM-RS resource to determine a second DL radio link quality after determining that the first DL radio link quality is lower than a threshold and the RLM configuration also indicates the backup RLM-RS resource; and send, via a physical (PHY) layer of the UE, an RLM indication to a higher layer of the UE based on at least one of the first DL radio link quality and the second DL radio link quality.

According to another aspect of the present disclosure, a method for wireless communication performed by a UE is provided. The method includes: receiving, from a serving cell, an RLM configuration; monitoring an RLM-RS resource indicated by the RLM configuration to determine a first DL radio link quality; monitoring a backup RLM-RS resource that is associated with the RLM-RS resource to determine a second DL radio link quality after determining that the first DL radio link quality is lower than a threshold and the RLM configuration also indicates the backup RLM-RS resource; and sending, via a PHY layer of the UE, an RLM indication to a higher layer of the UE based on at least one of the first DL radio link quality and the second DL radio link quality.

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

DESCRIPTION

Figure 1:
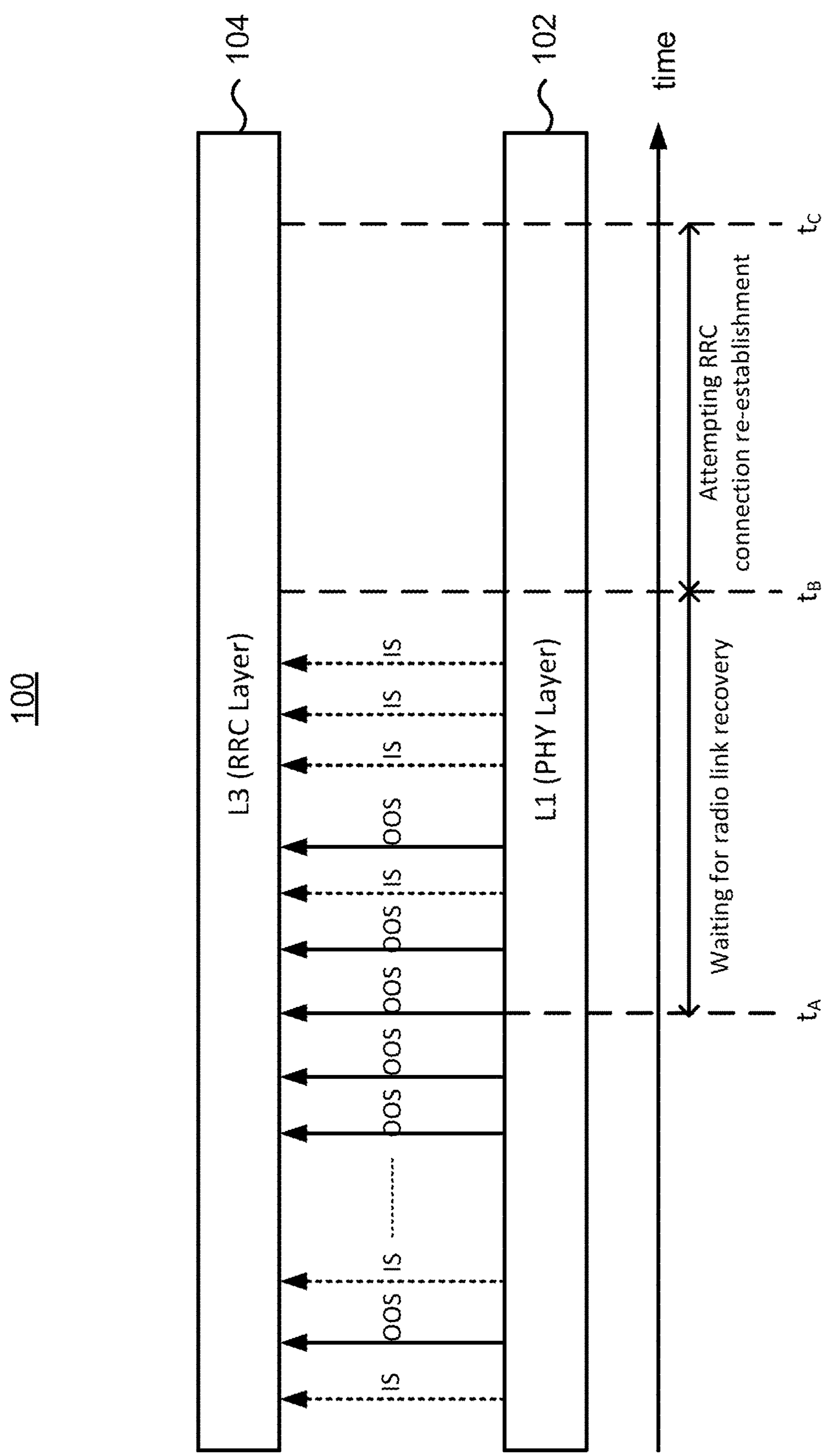
FIG. 1 is a diagram illustrating an example NR RLM procedure according to an example implementation of the present disclosure.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

When a transmission time interval (TTI) of a single NR frame includes DL transmission data, a guard period, and UL transmission data, the respective portions of the DL transmission data, the guard period, and the UL transmission data may be configured based on the network dynamics of NR. SL resources may also be provided in an NR frame to support ProSe services or V2X services.

Example description of some selected terms used in this disclosure are given below.

Primary Cell (PCell): For dual connectivity (DC) operation, PCell is the master cell group (MCG) cell, operating on the primary frequency, in which the UE either performs the initial connection establishment procedure or initiates the connection re-establishment procedure.

Primary SCG Cell (PSCell): For DC operation, PSCell is the secondary cell group (SCG) cell in which the UE performs random access when performing the Reconfiguration with Sync procedure.

Special Cell: For DC operation the term Special Cell (SpCell) refers to the PCell of the MCG or the PSCell of the SCG, otherwise the term Special Cell refers to the PCell.

Secondary Cell: For a UE configured with carrier aggregation (CA), a cell providing additional radio resources on top of Special Cell.

Serving Cell: For a UE in RRC_CONNECTED not configured with CA/DC, there is only one serving cell, which may be referred to as the primary cell. For a UE in RRC_CONNECTED configured with CA/DC, the term “serving cells” may be used to denote the set of cells including the SpCell(s) and all secondary cells.

Listen Before Talk (LBT) is a feature available in Wi-Fi that allows coexistence with other Wi-Fi nodes. LBT is a mechanism by which an equipment applies clear channel assessment (CCA) before using the channel. The 3rd Generation Partnership Project (3GPP) chose to specify a conservative LBT scheme similar to what Wi-Fi nodes use in order to ensure coexistence of Licensed Assisted Access (LAA) with Wi-Fi. LAA uses carrier aggregation in DL to combine LTE in the unlicensed spectrum (e.g., 5 GHz) with LTE in the licensed band. In NR, LBT may be also required prior to any transmission when operating on the unlicensed spectrum.

For a UE in the RRC_CONNECTED mode, the UE may declare Radio Link Failure (RLF) under at least one of the following conditions:

Timer expiry due to DL out-of-sync (OOS) detection;

Random access procedure failure detection;

Radio Link Control (RLC) failure detection.

FIG. 1 is a diagram illustrating an example NR RLM procedure 100 according to an example implementation of the present disclosure. A PHY layer 102 of a UE may send indications, including out-of-sync (OOS) indication and in-sync (IS) indication, to a radio resource control (RRC) layer 104 of the UE. The PHY layer 102 may determine which type of indication is sent to the RRC layer 104 based on DL radio link quality (of one or more RLM-RS resources). In one implementation, the PHY layer 102 may determine the DL radio link quality by measuring a reference signal. For example, the PHY layer 102 may send the IS indication when the DL radio link quality is higher than a first threshold, and the PHY layer 102 may send the OOS indication when the DL radio link quality is lower than a second threshold.

In one implementation, the RRC layer 104 detects a DL radio link problem if N1 consecutive OOS indications are received, where N1 is a positive integer. The RRC layer 104 may start a timer T1 (e.g., T310 described in Technical Specification (TS) 38.331 v15.6.0) upon receiving consecutive N1 (e.g., N310 described in TS 38.331) OOS indications. For example, if N1=3, after the RRC layer 104 receives 3 consecutive OOS indications, the timer T1 may be started at time $t_A$.

The UE may wait for a radio link recovery after time $t_A$. When the timer T1 is running, the RRC layer 104 may stop the timer T1 if N2 consecutive (e.g., N311 described in TS 38.331) IS indications are received, where N2 is a positive integer. For example, if N2=5, the RRC layer 104 may determine a successful radio link recovery after receiving 5 consecutive IS indications and thus stop the timer T1. On the contrary, the RRC layer 104 may determine that RLF occurs when the timer T1 expires at time $t_B$. The UE may start a timer T2 (e.g., T311 described in TS 38.331) at time $t_B$ for attempting an RRC Connection Re-establishment procedure.

In one implementation, the UE may enter the RRC_IDLE mode when the timer T1 expires at time $t_B$ and access stratum (AS) security is not activated. In one implementation, the UE may enter the RRC_IDLE mode when the timer T2 expires at time $t_C$ and the RRC Connection Re-establishment procedure is not successful.

In NR, the UE may monitor the indicated RLM-RS resources (e.g., Synchronization Signal (SS)-Block (SSB) or Channel State Information (CSI) RS) corresponding to a specific IS threshold and a specific OOS threshold. The network (NW) may configure a set of RLM-RS resources in advance but only activate certain RLM-RS resources for RLM in a period. The activation and de-activation of a certain RLM-RS may be indicated by a corresponding Medium Access Control (MAC) Control Element (CE) or specific Downlink Control Information (DCI). For the UE side, if the RLM-RS quality (of an SSB or a CSI-RS) becomes poor and is below the specific OOS threshold, the PHY layer 102 may start sending OOS indication(s) to the RRC layer 104. On the contrary, if the RLM-RS quality (of an SSB or a CSI-RS) is above the specific IS threshold, the PHY layer 102 may start sending IS indication(s) to the RRC layer 104.

Consequently, the absence of the RLM-RS due to LBT failure may cause unnecessary RLF. That is, if an RLM-RS is not transmitted on the (original) configured RLM-RS resource(s) due to LBT failure, the PHY layer 102 may consider that the DL radio link quality is lower than the given OOS threshold (e.g., the block error rate (BLER) associated with the RLM-RS is higher than 10%) and the PHY layer 102 may send an OOS indication to the upper layers (e.g., RRC layer 104). Since a base station or a UE may need to pass LBT first to occupy an LBT channel (which may be in units of 20 MHz), the UE may declare RLF if the current LBT channel of the UE is busy. Then, the UE may trigger an RRC Connection Re-establishment procedure (if security is activated), which may interrupt the ongoing service(s).

Enhanced RLM and RLF mechanisms are provided in the present disclosure to avoid the UE declaring unnecessary RLF and triggering an unnecessary RRC Connection Re-establishment procedure accordingly.

Case 1: Indication Time Interval for Two Successive Indications

In some implementations, when the DL radio link quality on all the (original) configured RLM-RS resources is lower than a given OOS threshold (e.g., $Q_{out}$), Layer 1 (e.g., the PHY layer) of the UE may send an OOS indication for the cell (e.g., a PCell or a PSCell or other serving cells) to the higher layers (e.g., the RRC layer). When the DL radio link quality on at least one of the (original) configured RLM-RS resources is higher than a given IS threshold (e.g., $Q_{in}$), Layer 1 of the UE may send an IS indication for the cell to the higher layers. Evaluation of the OOS indication and the IS indication for the configured RLM-RS resources may be performed based on TS 38.213 v15.6.0 and TS 38.133 v16.0.0. Two successive indications from Layer 1 may be separated by at least an indication time interval (e.g., $T_{Indication\_interval}$).

When discontinuous reception (DRX) is not used, $T_{Indication\_interval}$ is max(10 ms, $T_{RLM\text{-}RS,M}$), where $T_{RLM\text{-}RS,M}$ is the shortest periodicity of all configured RLM-RS resources for the monitored cell, which may correspond to $T_{SSB}$ specified in clause 8.1.2 of TS 38.133 v16.0.0 if the RLM-RS resource is SSB, or $T_{CSI-RS}$ specified in clause 8.1.3 of TS 38.133 v16.0.0 if the RLM-RS resource is CSI-RS. Note that $T_{SSB}$ is the periodicity of SSB configured for RLM and $T_{CSI-RS}$ is the periodicity of CSI-RS resource configured for RLM. When DRX is used, $T_{Indication\_interval}$ is max(10 ms, 1.5*DRX_cycle_length, 1.5*$T_{RLM-RS,M}$) if DRX cycle_length is less than or equal to 320 ms, and $T_{Indication\_interval}$ is DRX_cycle_length if DRX cycle_length is greater than 320 ms. When a timer T310 starts (e.g., specified in TS 38.331 v15.6.0), the UE may monitor the configured RLM-RS resources for recovery using the evaluation period and Layer 1 indication interval corresponding to the non-DRX mode until the timer T310 expires or is stopped. The notation max(a, b) refers to the maximum of value a and value b. The notation max(a, b, c) refers to the maximum of value a, value b and value c.

In some implementations, a UE may be configured to monitor a corresponding backup RLM-RS resource(s) outside Discovery Reference Signal (DRS) occasion(s). In some implementations, the UE may be configured to monitor the corresponding backup RLM-RS resource(s) associated with the original configured RLM-RS resources. Note that the original RLM-RS resources may be configured for an SSB (based on an associated SSB identity (ID)) or for a CSI-RS (based on an associated CSI-RS ID) via dedicated signaling (e.g., an RRC message) or broadcasting system information. In some implementations, the original configured RLM-RS resources may not be inside the DRS occasion(s).

Figure 2:
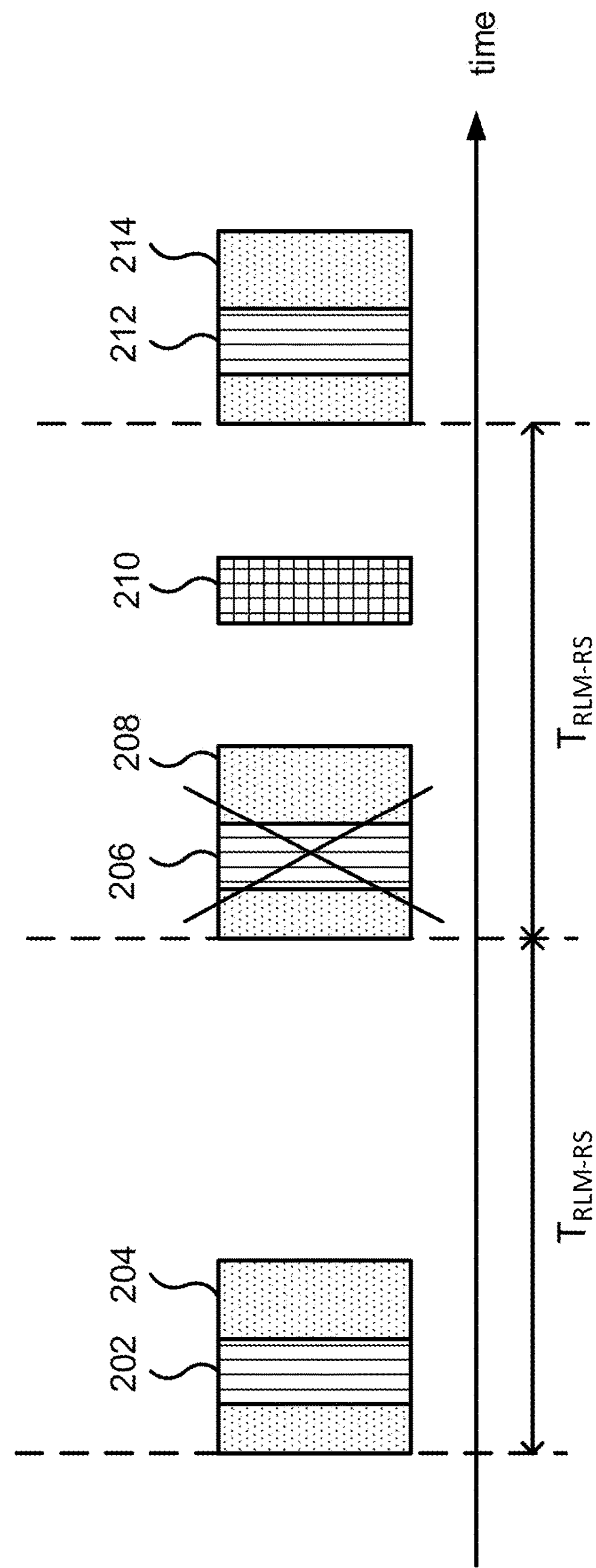
FIG. 2 is a diagram illustrating an example allocation of RLM-RS resources according to an example implementation of the present disclosure.

FIG. 2 is a diagram illustrating an example allocation 200 of RLM-RS resources according to an example implementation of the present disclosure. $T_{RLM-RS}$ refers to the periodicity of the RLM-RS resources (or DRS occasions). A BS may be able to transmit the configured RLM-RS on resource 202 within a DRS occasion 204 when an LBT procedure performed by the BS on the resource for transmitting the DRS occasion 204 (or the RLM-RS) is successful. On the contrary, the BS may be unable to transmit the configured RLM-RS on resource 206 within a DRS occasion 208 when an LBT procedure performed by the BS on the resource for transmitting the DRS occasion 208 (or the RLM-RS) fails. When the LBT procedure fails, the BS may try to transmit the RLM-RS on a corresponding backup RLM-RS resource(s) 210 outside the DRS occasion 208. On the next RLM-RS cycle, the BS may be able to transmit the configured RLM-RS on resource 212 within a DRS occasion 214 when an LBT procedure performed by the BS on the resource for transmitting the DRS occasion 214 (or the RLM-RS) is successful.

In one implementation, the BS may be unable to transmit the RLM-RS on the corresponding backup RLM-RS resource(s) if the LBT procedure performed by the BS on the corresponding backup RLM-RS resource(s) fails. In some implementations, if a UE determines that RLM-RS(s) is missing (e.g., based on a missing RLM-RS threshold to detect the missing of an RLM-RS resource sample), the UE may monitor the corresponding backup RLM-RS resource(s) (which may be outside DRS occasion(s)). In some implementations, if a UE determines that a DRS is missing (e.g., the UE does not receive and/or the UE does not decode the DRS during DRS occasion(s)), the UE may monitor the corresponding backup RLM-RS resource(s) (which may be outside DRS occasion(s)). The UE may know the DRS occasion(s) based on a DRS measurement timing configuration (DMTC) configured by the BS.

In some implementations, the configured backup RLM-RS resource(s) (which may be outside DRS occasion(s)) may be indicated via dedicated signaling (e.g., included in a RadioLinkMonitoringConfig Information Element (IE) of an RRC message). In some implementations, a UE may receive dedicated signaling (e.g., in a RadioLinkMonitoringConfig IE of an RRC message) that indicates the corresponding backup RLM-RS resource(s) of a configured RLM-RS, and the configured RLM-RS may be identified by an SSB index (e.g., SSB-Index) or a CSI-RS Index (e.g., NZP-CSI-RS-ResourceId). In some implementations, the UE may receive dedicated signaling (e.g., in a RadioLinkMonitoringConfig IE of an RRC message, SSB-MTC IE of an RRC message, or NZP-CSI-RS-ResourceSet IE of an RRC message, but not limited thereto) that indicates timing occasions (e.g., the periodicity and/or offset) of the corresponding backup RLM-RS resource(s) of a configured RLM-RS. The value of the periodicity and the value of the offset may be in units of milliseconds, subframes, mini-slots or slots, but not limited thereto. In some implementations, the UE may receive dedicated signaling (e.g., in a RadioLinkMonitoringConfig IE, SSB-MTC IE, or NZP-CSI-RS-ResourceSet IE, but not limited thereto) that indicates the timing occasions (e.g., offset only) of the corresponding backup RLM-RS resource(s) of a configured RLM-RS. The UE may assume the periodicity of the original RLM-RS resource and the periodicity of the backup RLM-RS resource may be the same. In some implementations, the UE may receive dedicated signaling (e.g., in a RadioLinkMonitoringConfig IE, SSB-MTC IE, or NZP-CSI-RS-ResourceSet IE, but not limited thereto) that indicates the timing occasions (e.g., the periodicity and/or offset) and the duration information of the corresponding backup RLM-RS resource of a configured RLM-RS. The duration information may indicate a time window in which the UE may receive a configured RLM-RS. The value of the time window may be in units of milliseconds, subframes, mini-slots or slots, but not limited to.

Table 1 below shows an example data structure of an RLM configuration.

TABLE 1

```
RadioLinkMonitoringConfig ::= SEQUENCE {
    failureDetectionResourcesToAddModList
        SEQUENCE     (SIZE(1..maxNrofFailureDetectionResources))   OF
        RadioLinkMonitoringRS                  OPTIONAL, -- Need N
    failureDetectionResourcesToReleaseList
        SEQUENCE     (SIZE(1..maxNrofFailureDetectionResources))   OF
        RadioLinkMonitoringRS-Id               OPTIONAL, -- Need N
    beamFailureInstanceMaxCount
```

TABLE 1-continued

```
        ENUMERATED {n1, n2, n3, n4, n5, n6, n8, n10} OPTIONAL, -- Need R
    beamFailureDetectionTimer
        ENUMERATED {pbfd1, pbfd2, pbfd3, pbfd4, pbfd5, pbfd6, pbfd8, pbfd10}
        OPTIONAL, -- Need R
}
RadioLinkMonitoringRS ::= SEQUENCE {
    radioLinkMonitoringRS-Id    RadioLinkMonitoringRS-Id,
    purpose   ENUMERATED {beamFailure, rlf, both},
    detectionResource CHOICE {
        ssb-Index    SSB-Index,
        csi-RS-Index   NZP-CSI-RS-ResoureId
        } ,
    backupRS-ID     BackupRS-ID
OPTIONAL,
}
```

In one implementation, the corresponding backup RLM-RS resource(s) for a configured RLM-RS may be configured with a backup RS ID (e.g., BackupRS-Id), and there may be a link between a radio link monitoring RS ID (e.g., RadioLinkMonitoringRS-Id) and the backup RS ID. RadioLinkMonitoringRS-Id may be used to identify one RadioLinkMonitoringRS, which may be an SSB (identified by an SSB Index) or a CSI-RS (identified by a CSI-RS Index). In another implementation, a radio link monitoring RS ID may not be associated with a backup RS ID.

Table 2 below shows an example data structure of a backup RS configuration.

TABLE 2

```
BackupRS-Config ::= CHOICE {
    release          NULL,
    setup         SEQUENCE {
        backupRS-ID              BackupRS-ID,
        backup-PeriodOffset         CHOICE {
            sf5           INTEGER(0..4),
            sf10          INTEGER(0..9),
            sf20          INTEGER(0..19),
        },
        backup-OccasionDuration              INTEGER(1..maxBackup-Duration),
    }
}
```

The backup RS ID may be associated with a resource configuration (e.g., BackupRS-Config) that includes the information of the timing occasions (e.g., the periodicity and/or offset) and/or duration, as shown in Table 2. For example, backup-PeriodOffset may indicate the periodicity and the offset of the backup RLM-RS resources for this frequency (or bandwidth part (BWP), or LBT channel, but not limited thereto). The value of the periodicity and the value of the offset may be in units of milliseconds, subframes, mini-slots or slots, but not limited thereto. For example, the duration information may indicate the duration of the backup RLM-RS resources for this frequency (or BWP, or LBT channel, but not limited thereto). The maximum backup duration (e.g., maxBackup-Duration) may be the maximum number of subframes (or milliseconds, or mini-slots, or slots) for the backup RLM-RS resource occasion.

In some implementations, if a UE is configured to monitor the backup RLM-RS resource(s) and if DRX is not used (or is not configured), the UE may apply a new formula to calculate the indication time interval (e.g., $T_{Indication\_interval}$), which may be different from max(10 ms, $T_{RLM\text{-}RS,M}$). $T_{RLM\text{-}RS,M}$ is the shortest periodicity of all configured RLM-RS resources for the monitored cell, which may correspond to $T_{SSB}$ specified in clause 8.1.2 of TS 38.133 v16.0.0 if the RLM-RS resource is SSB, or $T_{CSI\text{-}RS}$ specified in clause 8.1.3 of TS 38.133 v16.0.0 if the RLM-RS resource is CSI-RS. In some implementations, if a UE is connected to a cell (or a BS) that operates on an unlicensed spectrum and if DRX is not used (or is not configured), the UE may apply a new formula to calculate the indication time interval (e.g., $T_{Indication\_interval}$), which may be different from max(10 ms, $T_{RLM\text{-}RS,M}$).

In some implementations, the new formula to calculate the indication time interval (e.g., $T_{Indication\_interval}$) may involve a new value N3. In one implementation, the new formula to calculate the indication time interval (e.g., $T_{Indication\_interval}$) may be max(N3 ms, $T_{RLM\text{-}RS,M}$). The value of N3 may be pre-defined or pre-configured. For example, N3 may be less than 10. In some implementations, the new formula to calculate the indication time interval may be F1*$T_{RLM\text{-}RS,M}$, where F1 may be a pre-defined or pre-configured real number. For example, F1 may be less than 1. In some implementations, a UE may be configured with more than one value for F1. For example, if the channel busy ratio (or channel occupancy ratio) is higher than a given threshold, the UE may apply a smaller (or the smallest) value for F1. Otherwise, the UE may apply a larger (or the largest) value for F1. For example, a UE may be configured with two values for F1, including 0.5 and 0.75. If the channel busy ratio (or channel occupancy ratio) is higher than the given threshold, the UE may apply F1 with the value of 0.5. Otherwise, the UE may apply F1 with the value of 0.75. In one implementation, the UE may receive the given threshold from the NW via system information or dedicated signaling (e.g., an RRC message). In one implementation, the UE may be (pre)configured with the given threshold.

In some implementations, the new formula to calculate the indication time interval may be $T'_{RLM\text{-}RS,M}$, where $T'_{RLM\text{-}RS,M}$ is the shortest time interval among all configured RLM-RS resources (which may be inside DRS occasion(s)) and all the corresponding backup RLM-RS resource(s) (which may be outside DRS occasion(s)) for the monitored cell. For example, for the configured RLM-RS #1, the time interval between a configured RLM-RS resource inside a DRS occasion and its corresponding backup RLM-RS resource outside the DRS occasion is N4; for the configured RLM-RS #2, the time interval between a configured RLM-RS resource inside a DRS occasion and its (corresponding) backup RLM-RS resource outside the DRS occasion is N5. $T'_{RLM-RS,M}$ is N5 if N4 is greater than N5.

In some implementations, if a UE is configured to monitor the backup RLM-RS resource(s) and if DRX is not used (or is not configured), UE may apply the existing formula to calculate an indication time interval (e.g., $T_{Indication\_interval}$), which is max(10 ms, $T_{RLM-RS,M}$), where $T_{RLM-RS,M}$ is the shortest periodicity of all configured RLM-RS resources for the monitored cell. But, when the UE is required to monitor (or evaluate) an RLM-RS transmitted on the corresponding backup RLM-RS resource(s), Layer 1 of the UE may send an IS indication for the cell to the higher layers without considering the restriction based on $T_{Indication\_interval}$. For example, if an RLM-RS is not transmitted on the configured RLM-RS resource(s) or within a DRS occasion due to failed LBT, Layer 1 of the UE may send an OOS indication for the cell to the higher layers. However, the Layer 1 of the UE may send an IS indication for the cell to the higher layers if the DL radio link quality on the configured RLM-RS transmitted on the (corresponding) backup RLM-RS resource(s) is higher than a given IS threshold, even if the time interval between the OOS indication and the IS indication is shorter than the indication time interval (e.g., $T_{Indication\_interval}$).

In some implementations, if a UE is connected to a cell (or a BS) that operates on an unlicensed spectrum and if DRX is not used (or is not configured), the UE may apply the existing formula to calculate the indication time interval (e.g., $T_{Indication\_interval}$), which is max(10 ms, $T_{RLM-RS,M}$), where $T_{RLM-RS,M}$ is the shortest periodicity of all configured RLM-RS resources for the monitored cell. But, when the UE is required to monitor (or evaluate) an RLM-RS transmitted on the corresponding backup RLM-RS resource(s), Layer 1 of the UE may send an IS indication or an OOS indication for the cell to the higher layers without considering the restriction based on $T_{Indication\_interval}$. For example, when the DL radio link quality on all the corresponding backup RLM-RS resources (e.g., within an evaluation period, or within an indication time interval) is lower than a given OOS threshold (e.g., $Q_{out}$), Layer 1 (e.g., the PHY layer) of the UE may send an OOS indication for the cell to the higher layers (e.g., the RRC layer). For example, when the DL radio link quality on at least one of the corresponding backup RLM-RS resources (e.g., within an evaluation period, or within an indication time interval) is higher than a given IS threshold (e.g., $Q_{in}$), Layer 1 of the UE may send an IS indication for the cell to the higher layers. In some implementations, when the UE is required to monitor (or evaluate) an RLM-RS transmitted on the corresponding backup RLM-RS resource(s), Layer 1 of the UE may send an IS indication or an OOS indication for the cell to the higher layers without considering the restriction based on $T_{Indication\_interval}$.

In some implementations, the UE may use the proposed new formula only when the UE is required to monitor (or evaluate) an RLM-RS transmitted on the (corresponding) backup RLM-RS resource(s). The UE may use the existing formula instead of the proposed new formula once the UE receives the RLM-RS on the configured RLM-RS resource(s) or once the UE can receive or decode DRS.

In some implementations, if a UE is configured to monitor the backup RLM-RS resources and if DRX is used (or is configured), the UE may apply a new formula to calculate the indication time interval (e.g., $T_{Indication\_interval}$), which may be different from max(10 ms, 1.5*DRX_cycle_length, 1.5*$T_{RM-RS,M}$) if DRX cycle_length is less than or equal to 320 ms, and/or $T_{Indication\_interval}$ may be different from DRX_cycle_length if DRX cycle_length is greater than 320 ms. In some implementations, if a UE is connected to a cell (or a BS) that operates on an unlicensed spectrum and if DRX is used (or is configured), the UE may apply a new formula to calculate an indication time interval (e.g., $T_{Indication\_interval}$), which may be different from max(10 ms, 1.5*DRX_cycle_length, 1.5*$T_{RM-RS,M}$) if DRX cycle_length is less than or equal to 320 ms, and/or $T_{Indication\_interval}$ may be different from DRX_cycle_length if DRX cycle_length is greater than 320 ms.

In some implementations, the new formula to calculate an indication time interval (e.g., $T_{Indication\_interval}$) may involve a new value N6. In one implementation, the new formula to calculate the indication time interval (e.g., $T_{Indication\_interval}$) may be max(N6 ms, 1.5*DRX_cycle_length, 1.5*$T_{RLM-RS,M}$). The value of N6 may be pre-defined or pre-configured. For example, N6 may be less than 10. In some implementations, N3 and N6 may be the same parameter or configured with the same value. In some implementations, the new formula to calculate the indication time interval (e.g., $T_{Indication\_interval}$) may be max(10 ms, F2*DRX_cycle_length, F2*$T_{RLM-RS,M}$), where F2 may be a pre-defined or pre-configured real number. For example, F2 may be less than 1.5. In some implementations, a UE may be configured with more than one value for F2. For example, if the channel busy ratio (or channel occupancy ratio) is higher than a given threshold, the UE may apply the smaller (or the smallest) value for F2. Otherwise, the UE may apply the larger (or the largest) value for F2. For example, a UE may be configured with two values for F2, including 0.5 and 1. If the channel busy ratio (or channel occupancy ratio) is higher than the given threshold, the UE may apply F2 with the value 0.5. Otherwise, the UE may apply F2 with the value 1. The UE may receive the given threshold from the NW via system information or dedicated signaling. The UE may be (pre)configured with the given threshold.

In some implementations, the new formula to calculate the indication time interval (e.g., $T_{Indication\_interval}$) may be max(N6 ms, F2*DRX_cycle_length, F2*$T'_{RLM-RS,M}$), where N6 and F2 may be pre-defined or pre-configured. In some implementations, the new formula to calculate an indication time interval may be F2*$T_{RLM-RS,M}$, where $T_{RLM-RS,M}$ is the shortest periodicity of all configured RLM-RS resources for the monitored cell and F2 may be pre-defined or pre-configured. In some implementations, the new formula to calculate an indication time interval may be $T'_{RLM-RS,M}$, where $T'_{RLM-RS,M}$ is the shortest time interval among all configured RLM-RS resources (which may be inside DRS occasion(s)) and all the corresponding backup RLM-RS resource(s) (which may be outside DRS occasion(s)) for the monitored cell. In some implementations, the new formula to calculate the indication time interval may be max(N6 ms, F2*DRX_cycle_length, F2*$T'_{RLM-RS,M}$), where $T'_{RLM-RS,M}$ is the shortest time interval among all configured RLM-RS resources (which may be inside DRS occasion(s)) and all the corresponding backup RLM-RS resource(s) (which may be outside DRS occasion(s)) for the monitored cell.

In some implementations, if a UE is configured to monitor the backup RLM-RS resources and if DRX is used (or is configured), the UE may apply the existing formula to calculate an indication time interval (e.g., $T_{Indication\_interval}$), which is max(10 ms, 1.5*DRX_cycle_length, 1.5*$T_{RLM-RS,M}$) if DRX cycle_length is less than or equal to 320 ms, and $T_{Indication\_interval}$ is DRX_cycle_length if DRX cycle_length is greater than 320 ms. But, when the UE is required to monitor (or evaluate) an RLM-RS transmitted on the (corresponding) backup RLM-RS resource(s), Layer 1 of the UE may send an IS indication for the cell to the higher layers without considering the restriction based on $T_{Indication\_interval}$. For example, if an RLM-RS is not transmitted on the configured RLM-RS resource(s) or within a DRS occasion due to failed LBT, Layer 1 of the UE may send an OOS indication for the cell to the higher layers. However, the Layer 1 of the UE may send an IS indication for the cell to the higher layers if the DL radio link quality on the configured RLM-RS transmitted on the (corresponding) backup RLM-RS resource(s) is higher than a given IS threshold, even if the time interval between the OOS indication and the IS indication is shorter than the indication time interval $T_{Indication\_interval}$.

In some implementations, if a UE is connected to a cell (or base station) that operates on an unlicensed spectrum and if DRX is used (or is configured), the UE may apply the existing formula to calculate an indication time interval (e.g., $T_{Indication\_interval}$), which is max(10 ms, 1.5*DRX_cycle_length, 1.5*$T_{RLM-RS,M}$) if DRX cycle_length is less than or equal to 320 ms, and $T_{Indication\_interval}$ is DRX_cycle_length if DRX cycle_length is greater than 320 ms. But, when the UE is required to monitor (or evaluate) an RLM-RS transmitted on the (corresponding) backup RLM-RS resource(s), Layer 1 of the UE may send an IS indication or an OOS indication for the cell to the higher layers without considering the restriction based on $T_{Indication\_interval}$. For example, when the DL radio link quality on all the corresponding backup RLM-RS resources (e.g., within an evaluation period, or within an indication time interval) is lower than a given OOS threshold (e.g., $Q_{out}$), Layer 1 (e.g., PHY layer) of the UE may send an OOS indication for the cell to the higher layers (e.g., RRC layer). For example, when the DL radio link quality on at least one of the corresponding backup RLM-RS resources (e.g., within an evaluation period, or within an indication time interval) is higher than a given IS threshold (e.g., $Q_{in}$), Layer 1 of the UE may send an IS indication for the cell to the higher layers.

In some implementations, a UE may report a capability (to the NW) to indicate the supporting of the new formula to calculate the indication time interval (e.g., the new formula to calculate the indication time interval if the UE is configured to monitor the backup RLM-RS resource(s) in case that DRS is configured and/or in case that DRS is not configured). In some implementations, a UE that supports operating on an unlicensed spectrum (e.g., a UE capable of NR-U operations) may mandatorily support the new formula to calculate the indication time interval (e.g., the new formula to calculate the indication time interval if the UE is configured to monitor the backup RLM-RS resource(s) in case that DRS is configured and/or in case that DRS is not configured).

Case 2: Detection of Missing RLM-RS Transmission on Configured RLM-RS Resource(s)

In some implementations, a UE may be configured with a missing RLM-RS threshold to detect the missing of an RLM-RS resource sample (or the missing RLM-RS transmission on the configured RLM-RS resource(s)). In some implementations, the missing RLM-RS threshold (e.g., $Q_{missing}$) may be set based on the DL radio link quality.

In one implementation, when the DL radio link quality on at least one of the configured RLM-RS resources is higher than $Q_{in}$, Layer 1 of the UE may send an IS indication for the cell to the higher layers. When the DL radio link quality on all the configured RLM-RS resources is lower than $Q_{out}$ but higher than $Q_{missing}$, Layer 1 of the UE may send an OOS indication for the cell to the higher layers. When the DL radio link quality on all the configured RLM-RS resources is lower than $Q_{missing}$, Layer 1 of the UE may send an RLM-RS missing indication for the cell to the higher layers.

In some implementations, there may be a rlmInSyncOutOfSyncThreshold IE to indicate the BLER threshold pair index for IS/OOS indication generation and a rlmMissingThreshold IE to indicate the BLER threshold for RLM-RS missing indication generation. In some implementations, the UE may be configured with a missing RLM-RS threshold to detect the missing RLM-RS transmission on backup RLM-RS resource(s).

Table 3 below shows an example lookup table for BLER thresholds corresponding to different configurations and different indications.

TABLE 3

| Configuration | $BLER_{out}$ | $BLER_{in}$ | $BLER_{missing}$ |
|---|---|---|---|
| 0 | A % | B % | C % |
| 1 | D % | E % | F % |

In some implementations, there may be a rlmThreshold field to indicate the BLER threshold pair index for IS/OOS/RLM-RS missing indication generation by referring to a pre-defined table, such as Table 3. In some implementations, if the field rlmThreshold is present and set to n1 (e.g., n1 corresponds to the value 1), the UE may apply configuration 1 in Table 3. In some implementations, if the field rlmThreshold is absent, the UE may apply configuration 0 in Table 3. In some implementations, the field rlmThreshold may be mandatorily present if the cell operates on an unlicensed spectrum. In some implementations, if the field rlmThreshold is reconfigured, the UE may reset N310 or N311 and may stop T310 if running.

In some implementations, a missing RLM-RS threshold (e.g., $Q_{missing}$) may be set based on at least one of the following factors: channel busy ratio, related channel busy condition, channel occupancy situation, or LBT results. For example, when the DL radio link quality on at least one of the configured RLM-RS resources is higher than $Q_{in}$, Layer 1 of the UE may send an IS indication for the cell to the higher layers. When the DL radio link quality on all the configured RLM-RS resources is lower than $Q_{out}$ but the channel busy ratio is lower than $Q_{missing}$ Layer 1 of the UE may send an OOS indication for the cell to the higher layers. When the DL radio link quality on all the configured RLM-RS resources is lower than $Q_{out}$ but the channel busy ratio is higher than $Q_{missing}$, Layer 1 of the UE may send an RLM-RS-missing indication for the cell to the higher layers. In some implementations, the missing RLM-RS threshold (e.g., $Q_{missing}$) may be broadcast in system information. In some implementations, the missing RLM-RS threshold (e.g., $Q_{missing}$) may be configured via dedicated signaling (e.g., included in CellGroupConfig IE of an RRC message).

In some implementations, a UE may report a capability to indicate the supporting of detection of a missing RLM-RS resource sample (or detection of the missing RLM-RS transmission on configured RLM-RS resource(s)). For example, the capability may indicate that the UE is configured with rlmThreshold or a missing RLM-RS threshold. In some implementations, a UE that supports operating on an unlicensed spectrum (e.g., a UE capable of NR-U operations) may mandatorily support the detection of missing RLM-RS resource samples (or the detection of missing RLM-RS transmission on configured RLM-RS resource(s)).

In some implementations, two successive indications (including OOS indication and IS indication) from Layer 1 may be separated by at least the indication time interval (e.g., $T_{Indication\_interval}$). Sending an RLM-RS missing indication is not required to follow the restriction of the indication time interval (e.g., $T_{Indication\_interval}$). In some implementations, two successive indications (including OOS indication, IS indication, and RLM-RS missing indication) from Layer 1 may be separated by at least the indication time interval (e.g., $T_{Indication\_interval}$).

In some implementations, if a backup RLM-RS resource(s) is configured, Layer 1 of the UE may send an IS indication for the cell to the higher layers when the DL radio link quality on at least one of the configured RLM-RS resources (which may be within a DRS occasion) is higher than $Q_{in}$, or when the DL radio link quality on all the configured RLM-RS resources (which may be within a DRS occasion) is lower than $Q_{in}$ but the DL radio link quality of at least one of the configured (corresponding) backup RLM-RS resources (e.g., within an evaluation period, or within an indication time interval) is higher than $Q_{in}$. In some implementations, if a backup RLM-RS resource(s) is configured, Layer 1 of the UE may send an OOS indication for the cell to the higher layers when the DL radio link quality on all the configured RLM-RS resources (which may be within a DRS occasion) is lower than $Q_{out}$ and the DL radio link quality on all the configured (corresponding) backup RLM-RS resources (e.g., within an evaluation period, or within an indication time interval) is lower than $Q_{out}$. In some implementations, if backup RLM-RS resource(s) is configured, Layer 1 of the UE may not send any OOS indication for the cell to the higher layers when the DL radio link quality on all the configured RLM-RS resources is lower than $Q_{out}$.

In some implementations, Layer 1 may send an IS indication or an OOS indication to upper layers (e.g., the RRC layer). The upper layers may remove (or ignore) an OOS indication that is determined based on the original configured RLM-RS resources if the upper layers receive an IS indication or an OOS indication that is determined based on the corresponding backup RLM-RS resource(s). In some implementations, when sending an IS indication or OOS indication, Layer 1 may further indicate whether or not the indication is determined based on the RLM-RS resource(s) in a DRS occasion. In some implementations, when sending an IS indication or OOS indication, Layer 1 may further indicate whether the indication is determined based on the original configured RLM-RS resource(s) or the corresponding backup configured RLM-RS resource(s).

Case 3: Detection of PHY Layer Problems in RRC_CONNECTED

In some implementations, if a UE is configured with a missing RLM-RS threshold to detect the missing of an RLM-RS resource sample (or the missing RLM-RS transmission on configured RLM-RS resource(s)) or is connected to a cell operating on an unlicensed spectrum, the UE may start a timer for radio link recovery by higher layers after receiving X consecutive RLM indications, each of which is either the OOS indication or the RLM-RS missing indication, where X may be a preconfigured positive integer. For example, the UE may start the timer T310 (or a new Timer T3) for a corresponding SpCell after receiving N310 consecutive OOS indications and RLM-RS missing indications for the SpCell from lower layers.

In some implementations, if a UE is configured with a missing RLM-RS threshold to detect the missing of an RLM-RS resource sample (or the missing RLM-RS transmission on configured RLM-RS resource(s)) or is connected to a cell operating on an unlicensed spectrum, the UE may start the timer T310 (or a new Timer T3) for the corresponding SpCell after receiving N310 consecutive OOS indications and RLM-RS missing indications for the SpCell from lower layers when none of the timers T300, T301, T304, T311 and T319 is running.

In some implementations, if a UE is configured with a missing RLM-RS threshold to detect the missing of an RLM-RS resource sample (or the missing RLM-RS transmission on configured RLM-RS resource(s)) or is connected to a cell operating on an unlicensed spectrum, the UE may be configured with two values, e.g., N310 and N310-backup. The UE may start the timer T310 (or a new Timer T3) for the corresponding SpCell after receiving N310 consecutive OOS indications for the SpCell from lower layers or after receiving N310-backup consecutive OOS indications and RLM-RS missing indications for the SpCell from lower layers.

In some implementations, if a UE is configured with a missing RLM-RS threshold to detect the missing of an RLM-RS resource sample (or the missing RLM-RS transmission on configured RLM-RS resource(s)) or is connected to a cell operating on an unlicensed spectrum, the UE may start the timer T310 (or a new Timer T3) for the corresponding SpCell after receiving N310 consecutive OOS indications without considering the RLM-RS missing indications for the SpCell from lower layers.

In some implementations, if a UE is configured with a missing RLM-RS threshold to detect the missing of an RLM-RS resource sample (or the missing RLM-RS transmission on configured RLM-RS resource(s)) or is connected to a cell operating on an unlicensed spectrum, the UE may start the timer T310 (or a new Timer T3) for the corresponding SpCell after receiving N310 consecutive OOS indications without considering the RLM-RS missing indications for the SpCell from lower layers when none of the timers T300, T301, T304, T311 and T319 is running.

In some implementations, the RLM-RS missing indication reported by Layer 1 may not affect the evaluation of the number of consecutive OOS indications.

In some implementations, the NW may configure a UE (e.g., via dedicated signaling) for whether an RLM-RS missing indication is treated as an OOS indication when calculating N310 consecutive OOS indications. Dedicated signaling may be an RRC message, a MAC CE or DCI.

In some implementations, a received RLM-RS missing indication may be treated as an OOS indication if an RLM indication following the received RLM-RS missing indication is an OOS indication. The UE may start the timer T310 for the corresponding SpCell after receiving N310 consecutive OOS indications for the SpCell from lower layers when none of the timers T300, T301, T304, T311 and T319 is running.

In some implementations, a received RLM-RS missing indication may be treated as an OOS indication if a previous RLM indication of the received RLM-RS missing indication is an OOS indication. The UE may start the timer T310 for the corresponding SpCell after receiving N310 consecutive OOS indications for the SpCell from lower layers when none of the timers T300, T301, T304, T311 and T319 is running.

Case 4: Recovery of PHY Layer Problems

In some implementations, if a UE is configured with a missing RLM-RS threshold to detect the missing of an RLM-RS resource sample (or the missing RLM-RS transmission on configured RLM-RS resource(s)) or is connected to a cell operating on an unlicensed spectrum, the UE may stop a timer for radio link recovery by higher layers after receiving Y consecutive RLM indications, each of which is either the IS indication or the RLM-RS missing indication, where Y may be a preconfigured positive integer. For example, the UE may stop the timer T310 (or a new timer T3) for the corresponding SpCell after receiving N311 consecutive IS indications and RLM-RS missing indications while the timer T310 is running (or the new timer T3 is running) for the SpCell from lower layers. The value of N311 may be configurable (e.g., via broadcasting system information or dedicated signaling).

In some implementations, if a UE is configured with a missing RLM-RS threshold to detect the missing of an RLM-RS resource sample (or the missing RLM-RS transmission on configured RLM-RS resource(s)) or is connected to a cell operating on an unlicensed spectrum, the UE may be configured with two values, e.g., N311 and N311-backup. The UE may stop the timer T310 (or a new timer T3) for the corresponding SpCell after receiving N311 consecutive IS indications while the timer T310 is running (or the new timer T3 is running) for the SpCell from lower layers or after receiving N311-backup consecutive IS indications and RLM-RS missing indications while the timer T310 is running (or the new timer T3 is running) for the SpCell from lower layers.

In some implementations, if a UE is configured with a missing RLM-RS threshold to detect the missing of an RLM-RS resource sample (or the missing RLM-RS transmission on configured RLM-RS resource(s)) or is connected to a cell operating on an unlicensed spectrum, the UE may stop the timer T310 (or a new timer T3) for the corresponding SpCell after receiving N311 consecutive IS indications without considering RLM-RS missing indications while the timer T310 is running (or the new timer T3 is running) for the SpCell from lower layers.

In some implementations, the RLM-RS missing indication reported by Layer 1 may not affect the evaluation of the number of consecutive IS indications.

In some implementations, the NW may configure a UE for whether an RLM-RS missing indication is treated as an IS indication when calculating N311 consecutive IS indications.

In some implementations, a received RLM-RS missing indication may be treated as an IS indication if an RLM indication following the received RLM-RS missing indication is an IS indication. The UE may stop the timer T310 for the corresponding SpCell after receiving N311 consecutive IS indications for the SpCell from lower layers while the timer T310 is running.

In some implementations, a received RLM-RS missing indication may be treated as an IS indication if a previous RLM indication of the received RLM-RS missing indication is an IS indication. The UE may stop the timer T310 for the corresponding SpCell after receiving N311 consecutive IS indications for the SpCell from lower layers while the timer T310 is running.

In one implementation, if the timer T310 (or the new timer T3) is kept in an MCG and the timer T310 (or the new timer T3) expires, the UE may initiate an RRC Connection Re-establishment procedure if AS security is activated. Otherwise, the UE may transition to the RRC_IDLE state. If the timer T310 (or the new timer T3) is kept in an SCG and the timer T310 (or the new timer T3) expires, the UE may inform the NW (e.g., the master node, the secondary node) about the SCG radio link failure by initiating an SCG failure information procedure.

Case 5: Separate Timer/Counter for Unsuccessful RLM-RS Detection Due to Failed LBT In some implementations, if a UE is configured with a missing RLM-RS threshold to detect the missing of an RLM-RS resource sample (or the missing RLM-RS transmission on configured RLM-RS resource(s)) or is connected to a cell operating on an unlicensed spectrum, the UE may be configured with a timer T4 to count the number of received RLM-RS missing indication(s). The timer T4 may be maintained by the RRC layer. In one implementation, when the timer T4 is running and the received RLM-RS missing indication(s) reaches a configured number (e.g., N7), the UE may perform an RRC Connection Re-establishment procedure. In one implementation, when the timer T4 is running and the received RLM-RS missing indication(s) reaches a configured number (e.g., N7), the UE may perform a BWP (or LBT channel) switch procedure.

In one implementation, when the timer T4 is running and the received RLM-RS missing indication(s) reaches a configured number (e.g., N7), the UE may select another (corresponding) backup RLM-RS resource(s) (if configured). For example, the NW may configure the UE with two sets of backup RLM-RS resources located on different LBT channels or BWPs (but not limited thereto). The UE may monitor the first set of backup RLM-RS resources located on the first LBT channel or the first BWP (e.g., based on the configuration or pre-defined rules). When the timer T4 is running and the received RLM-RS missing indication(s) reaches a configured number (e.g., N7), the UE may start monitoring the second set of backup RLM-RS resources located on the second LBT channel or the second BWP.

In one implementation, when the timer T4 is running and the received RLM-RS missing indication(s) reaches a configured number (e.g., N7), the UE may perform predefined or preconfigured action(s). In some implementations, if the timer T4 is running and the received RLM-RS missing indication(s) reaches a configured number (e.g., N7) while the timer T310 is not running, the UE may not perform the RRC Connection Re-establishment procedure but may perform other actions such as the BWP or LBT channel switch procedure. In one implementation, if the timer T4 is running and the received RLM-RS missing indication(s) reaches a configured number (e.g., N7) while the timer T310 is running, the UE may not perform the RRC Connection Re-establishment procedure.

In some implementations, the UE may start the timer T4 when receiving an RLM-RS missing indication. In some implementations, a UE may stop the timer T4 when receiving an OOS indication or an IS indication. In some implementations, the UE may stop the timer T4 when the timer T4 is reconfigured. In some implementations, the UE may stop the timer T4 if N7 is reconfigured. In some implementations, the UE may reset a counter for N7 if the timer T4 is reconfigured. In some implementations, the UE may reset the counter for N7 if N7 is reconfigured.

In some implementations, if a UE is configured with a missing RLM-RS threshold to detect the missing of an RLM-RS resource sample (or the missing RLM-RS transmission on configured RLM-RS resource(s)) or is connected to a cell operating on an unlicensed spectrum, the UE may be configured with a counter C1 to count the number of received RLM-RS missing indication(s). The counter C1 may be maintained by the RRC layer. In one implementation, when the counter C1 reaches a configured number (e.g., N8), the UE may perform an RRC Connection Re-establishment procedure. In one implementation, when the counter C1 reaches a configured number (e.g., N8), the UE may perform a BWP (or LBT channel) switch procedure.

In one implementation, when the counter C1 reaches a configured number (e.g., N8), the UE may perform pre-defined or preconfigured action(s). In some implementations, if the counter C1 reaches a configured number (e.g., N8) while the timer T310 is not running, the UE may not perform the RRC Connection Re-establishment but may perform other actions such as the BWP or LBT channel switch procedure. In one implementation, if the counter C1 reaches a configured number (e.g., N8) while the timer T310 is running, the UE may perform the RRC re-establishment procedure.

In some implementations, the counter C1 may reset under at least one of the following conditions:

- when an OOS indication or an IS indication is received;
- when the timer T310 expires;
- when the UE receives N311 consecutive IS indications.

In some implementations, the counter C1 may increment by 1 when an RLM-RS missing indication is received. In some implementations, the counter C1 may increment by 1 when neither OOS indication nor IS indication is received from Layer 1 when a timer T5 expires. For example, Layer 1 of the UE may be configured with a missing RLM-RS threshold to detect the missing of an RLM-RS resource sample (or the missing RLM-RS transmission on configured RLM-RS resource(s)), but Layer 1 of the UE may not be required to send an RLM-RS missing indication to upper layers. The timer T5 may be pre-defined or preconfigured. The timer T5 may be started when an IS indication or an OOS indication is received from Layer 1. In some implementations, the UE may reset the counter C1 if the counter C1 is reconfigured.

Case 6: Scaling T1, T2, N1, N2 Subject to Certain Unlicensed Spectrum Operation

In one implementation, the UE may apply the existing RLM/RLF mechanism with adjusted parameters when the UE is operated on an unlicensed spectrum. Example RLM/RLM mechanism may include detection of DL radio link problem if consecutive N1 number of periodic OOS indications are received by the RRC layer. In one implementation, the timer T1 (e.g., T310 in TS 38.331 v16.0.0) may be started upon receiving consecutive N1 periodic OOS indications. The RRC layer may stop the timer if consecutive N2 IS indications are received while the timer T1 is running. When the timer T1 expires, RLF may occur and the UE may start the timer T2 (e.g., T311 in TS 38.331 v16.0.0) for the RRC Connection Re-establishment procedure (if security is activated). When the timer T2 expires and the RRC Connection Re-establishment procedure is not successful, the UE may enter the RRC_IDLE mode. In one implementation, the values of the parameters T1, T2, N1, and/or N2 may be adjusted according to certain criteria. The criteria may include:

- whether the wide-band LBT is applied;
- whether the cell is connected to a Non-Public Network (NPN);
- whether the non-access stratum (NAS) configures the preference to stay in the unlicensed spectrum;
- whether a certain Subcarrier Spacing (SCS) is used (e.g., to be able to meet a specific requirement).

Adjustment for the parameters T1, T2, N1, N2 may include the following two options.

Option 1: UE May Apply a Scaling Factor to at Least One of Those Parameters

The scaling factor may be pre-defined or configured by a BS (e.g., a gNB). For instance, the scaling factor may be selected from a list of real numbers, including {1, 2, 3}. The scaling factor=1 refers to a situation in which LBT failure is not considered during the RLM/RLF. The scaling factor=2 represents that the channel busy ratio is under medium level. The scaling factor=3 represents that the channel busy ratio is under high level and the UE may extend the parameter T1 or N1 as large as possible to avoid unnecessary RLF. The medium or high level of the channel busy ratio may be evaluated by comparing a channel occupancy ratio (or an RLM-RS signal quality) with a given threshold. In one implementation, the UE may apply the scaled T1, T2, N1, and/or N2 when the first OOS or IS indication is received from the PHY layer.

Option 2: UE May Apply a Random Back-Off Mechanism (e.g., Using a Random Variable) to at Least One of Those Parameters UE may extend at least one of the parameters T1, T2, N1, or N2 by adding an offset determined by a random variable. For example, the UE may change N1 to N1+2 or N1+5 based on random back-off results. The window of the random back-off may be pre-defined or configured by gNB. In one implementation, the UE may apply the random back-off to T1, T2, N1, or N2 when the first OOS or IS indication is received from the PHY layer.

In one implementation, the values of the parameters T1, T2, N1, and/or N2 (or the related scaling factors/back-offs) may be configured by the MCG and the SCG independently. The UE may adjust the values of the parameters T1, T2, N1, and/or N2 for each cell group independently. For example, if a certain criterion is satisfied on the cell group A, T1, T2, N1, and/or N2 value of the cell group A may be adjusted accordingly.

In one implementation, the UE may suspend the enhanced RLM/RLF mechanisms provided in the present disclosure under at least one of the following conditions: (a) the corresponding backup RLM-RS resource(s) are de-configured, (b) MCG radio link failure, inter-RAT/intra-RAT handover procedure, or (c) RRC state transitions (e.g., from the RRC_CONNECTED state to the RRC_INACTIVE state). Example enhanced RLM/RLF mechanisms may include (a) applying the new formula to calculate the indication time interval and (b) not sending an OOS indication when the DL radio link quality on all the configured RLM-RS resources is lower than $Q_{out}$. Then, the UE may apply the traditional RLM/RLF mechanisms (e.g., applying the existing formula to calculate the indication time interval).

Figure 3:
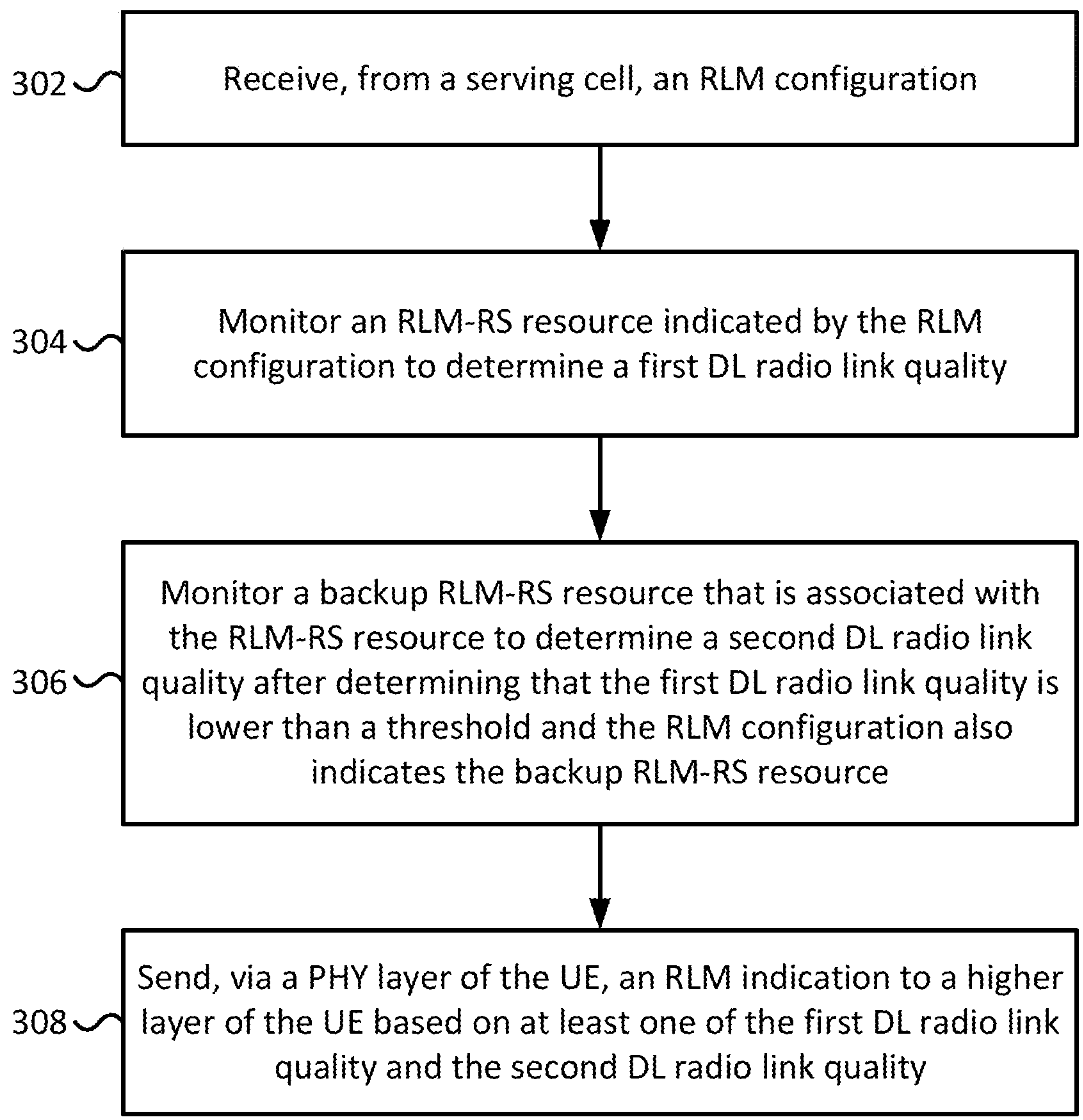
FIG. 3 is a flowchart of a method performed by a UE for RLM according to an example implementation of the present disclosure.

FIG. 3 is a flowchart of a method 300 performed by a UE for RLM according to an example implementation of the present disclosure. In action 302, the UE may receive, from a serving cell (or the associated BS), an RLM configuration. In one implementation, the RLM configuration indicates an RLM-RS resource. In one implementation, the RLM configuration indicates an RLM-RS resource and a backup RLM-RS resource that is associated with the RLM-RS resource. The RLM configuration may include at least one of a periodicity of the backup RLM-RS resource and a timing offset of the backup RLM-RS resource. Description of the backup RLM-RS resource may be referred to the implementations in Case 1.

In action 304, the UE may monitor an RLM-RS resource indicated by the RLM configuration to determine a first DL radio link quality.

In action 306, the UE may monitor a backup RLM-RS resource that is associated with the RLM-RS resource to determine a second DL radio link quality after determining that the first DL radio link quality is lower than a threshold and the RLM configuration also indicates the backup RLM-RS resource. In one implementation, the UE may monitor only the RLM-RS resource when the RLM configuration does not indicate the backup RLM-RS resource. In one implementation, the UE may determine whether to monitor the RLM-RS resource based on the first DL radio link quality.

In action 308, the PHY layer of the UE may send an RLM indication to a higher layer of the UE based on at least one of the first DL radio link quality and the second DL radio link quality.

In one implementation, two successive RLM indication may be separated by at least an indication timer interval and the UE may determine the indication time interval. In one implementation, the indication time interval has different values depending on whether or not the RLM configuration indicates the backup RLM-RS resource. For example, the indication time interval may be larger when the RLM configuration does not indicate the backup RLM-RS resource, and the indication time interval may be smaller when the RLM configuration indicates the backup RLM-RS resource.

In one implementation, the UE may determine the indication time interval based on an interval between the RLM-RS resource and the backup RLM-RS resource when the RLM configuration indicates the backup RLM-RS resource. For example, the indication time interval may be calculated based on the shortest time interval among all configured RLM-RS resource(s) and all the corresponding backup RLM-RS resource(s) for the monitored cell. The formula for calculating the indication time interval may be referred to the implementations in Case 1.

In one implementation, the types of the RLM indication may include an IS indication and an OOS indication, and the RLM configuration may indicate a first threshold associated with the IS indication and a second threshold associated with the OOS indication. In one implementation, the RLM indication is the IS indication when the first DL radio link quality is higher than the first threshold or the second DL radio link quality is higher than the first threshold (e.g., $Q_{in}$). The RLM indication is the OOS indication when both the first DL radio link quality and the second DL radio link quality are lower than the second threshold (e.g., $Q_{out}$).

In one implementation, the types of the RLM indication may include an IS indication, an OOS indication, and an RLM missing indication. The RLM configuration may indicate a first threshold associated with the IS indication, a second threshold associated with the OOS indication, and a third threshold associated with the RLM missing indication. The RLM missing indication may be used in combination with the backup RLM-RS resource in one implementation. For example, the RLM configuration may indicate the backup RLM-RS resource, the first threshold, the second threshold, and the third threshold. The RLM missing indication may also be used when the backup RLM-RS resource is not indicated in the RLM configuration in another implementation.

In one implementation, the RLM indication is the IS indication when the first DL radio link quality is higher than the first threshold (e.g., $Q_{in}$). The RLM indication is the OOS indication when the first DL radio link quality is lower than the second threshold (e.g., $Q_{out}$) but higher than the third threshold (e.g., $Q_{missing}$). The RLM indication is the RLM-RS missing indication when the first DL radio link quality is lower than the third threshold (e.g., $Q_{missing}$).

In one implementation, the UE may start a timer for radio link recovery by the higher layer after receiving a preconfigured number of consecutive RLM indications, each of which is either the OOS indication or the RLM-RS missing indication. For example, if the preconfigured number of consecutive RLM indications for starting the timer for radio link recovery is 4. The UE may start the timer after receiving 4 consecutive RLM indications as {OOS, RLM-RS missing, RLM-RS missing, OOS}.

In one implementation, the UE may stop a timer for radio link recovery by the higher layer after receiving a preconfigured number of consecutive RLM indications, each of which is either the IS indication or the RLM-RS missing indication. For example, if the preconfigured number of consecutive RLM indications for stopping the timer for radio link recovery is 6. The UE may stop the timer after receiving 6 consecutive RLM indications as {RLM-RS missing, RLM-RS missing, IS, RLM-RS missing, IS, IS}.

Figure 4:
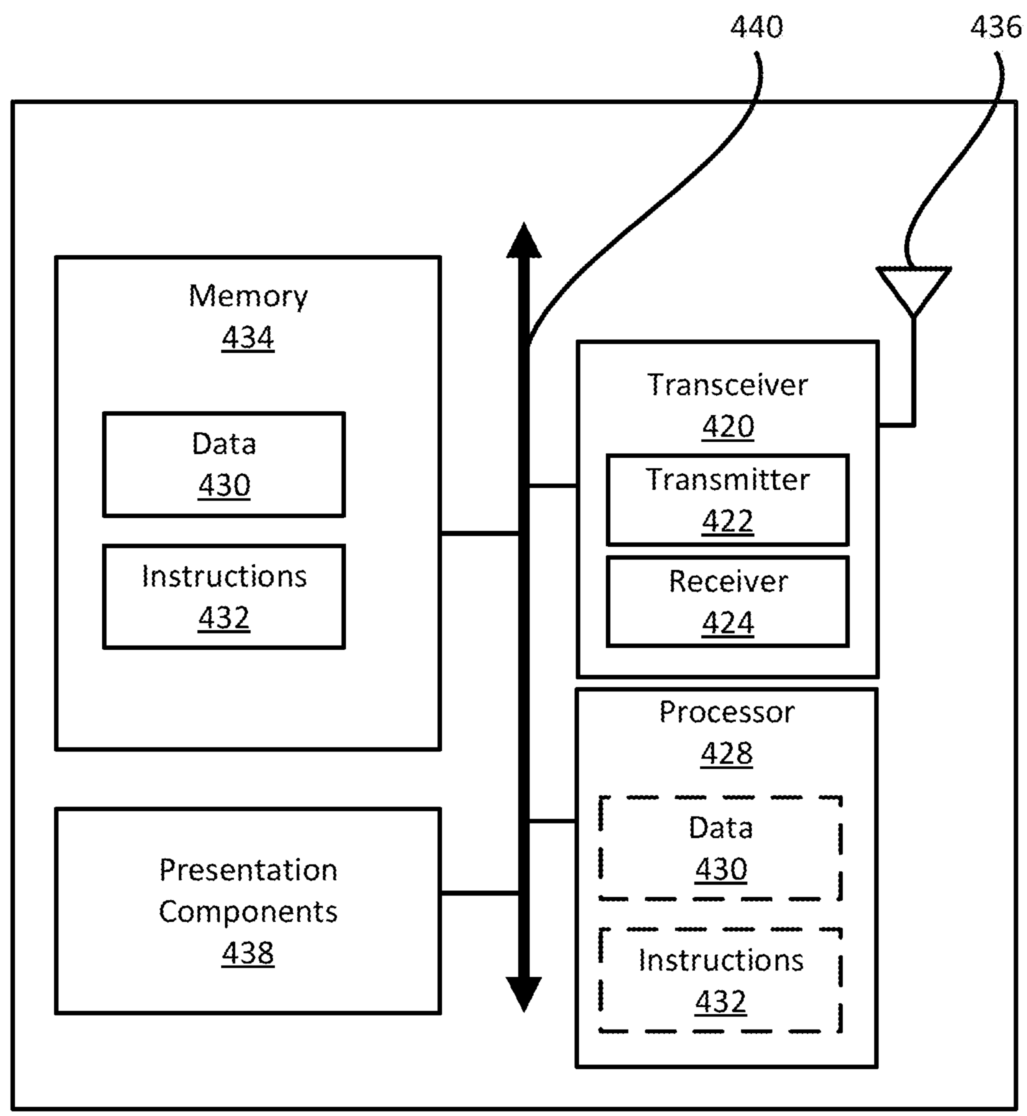
FIG. 4 is a block diagram illustrating a node for wireless communication in accordance with various aspects of the present disclosure.

FIG. 4 is a block diagram illustrating a node 400 for wireless communication according to the present disclosure. As illustrated in FIG. 4, a node 400 may include a transceiver 420, a processor 428, a memory 434, one or more presentation components 438, and at least one antenna 436. The node 400 may also include a radio frequency (RF) spectrum band module, a BS communications module, a network communications module, and a system communications management module, Input/Output (I/O) ports, I/O components, and a power supply (not illustrated in FIG. 4).

Each of the components may directly or indirectly communicate with each other over one or more buses 440. The node 400 may be a UE or a BS that performs various functions disclosed with reference to FIGS. 1 through 3.

The transceiver 420 has a transmitter 422 (e.g., transmitting/transmission circuitry) and a receiver 424 (e.g., receiving/reception circuitry) and may be configured to transmit and/or receive time and/or frequency resource partitioning information. The transceiver 420 may be configured to transmit in different types of subframes and slots including but not limited to usable, non-usable and flexibly usable subframes and slot formats. The transceiver 420 may be configured to receive data and control channels.

The node 400 may include a variety of computer-readable media. Computer-readable media may be any available media that may be accessed by the node 400 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 434 may include computer-storage media in the form of volatile and/or non-volatile memory. The memory 434 may be removable, non-removable, or a combination thereof. Example memory may include solid-state memory, hard drives, optical-disc drives, etc. As illustrated in FIG. 4, the memory 434 may store computer-readable, computer-executable instructions 432 (e.g., software codes) that are configured to cause the processor 428 to perform various functions disclosed herein, for example, with reference to FIGS. 1 through 3. Alternatively, the instructions 432 may not be directly executable by the processor 428 but be configured to cause the node 400 (e.g., when compiled and executed) to perform various functions disclosed herein.

The processor 428 (e.g., having processing circuitry) may include an intelligent hardware device, e.g., a Central Processing Unit (CPU), a microcontroller, an ASIC, etc. The processor 428 may include memory. The processor 428 may process the data 430 and the instructions 432 received from the memory 434, and information transmitted and received via the transceiver 420, the baseband communications module, and/or the network communications module. The processor 428 may also process information to be sent to the transceiver 420 for transmission via the antenna 436 to the network communications module for transmission to a core network.

One or more presentation components 438 may present data indications to a person or another device. Examples of presentation components 438 may include a display device, a speaker, a printing component, and a vibrating component, etc.

In view of the disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE), comprising:

one or more non-transitory computer-readable media having computer-executable instructions embodied therein; and at least one processor coupled to the one or more non-transitory computer-readable media, the at least one processor configured to execute the computer-executable instructions to:

receive, from a serving cell, a radio link monitoring (RLM) configuration;

monitor an RLM reference signal (RS) (RLM-RS) resource indicated by the RLM configuration to determine a first downlink (DL) radio link quality;

monitor a backup RLM-RS resource that is associated with the RLM-RS resource to determine a second DL radio link quality after determining that the first DL radio link quality is lower than a first threshold and the RLM configuration also indicates the backup RLM-RS resource;

send, via a physical (PHY) layer of the UE, an RLM indication to a higher layer of the UE based on at least one of the first DL radio link quality and the second DL radio link quality; and determine an indication time interval, wherein two successive RLM indications are separated by at least the indication time interval, and the indication time interval has different values depending on whether or not the RLM configuration also indicates the backup RLM-RS resource.

2. The UE of claim 1, wherein the indication time interval is determined based on an interval between the RLM-RS resource and the backup RLM-RS resource when the RLM configuration also indicates the backup RLM-RS resource.

3. The UE of claim 1, wherein the RLM configuration further indicates at least one of a periodicity of the backup RLM-RS resource and a timing offset of the backup RLM-RS resource.

4. The UE of claim 1, wherein:

types of the RLM indication include an in-sync (IS) indication and an out-of-sync (OOS) indication, and the RLM configuration further indicates a second threshold associated with the IS indication and a third threshold associated with the OOS indication.

5. The UE of claim 4, wherein:

the RLM indication is the IS indication when the first DL radio link quality is higher than the second threshold or the second DL radio link quality is higher than the second threshold, and the RLM indication is the OOS indication when both the first DL radio link quality and the second DL radio link quality are lower than the third threshold.

6. The UE of claim 4, wherein:

the types of the RLM indication further include an RLM missing indication, and the RLM configuration further indicates a fourth threshold associated with the RLM missing indication.

7. The UE of claim 6, wherein:

the RLM indication is the IS indication when the first DL radio link quality is higher than the second threshold, the RLM indication is the OOS indication when the first DL radio link quality is lower than the third threshold but higher than the fourth threshold, and the RLM indication is the RLM-RS missing indication when the first DL radio link quality is lower than the fourth threshold.

8. The UE of claim 6, wherein the at least one processor is further configured to execute the computer-executable instructions to:

start a timer for radio link recovery by the higher layer after receiving a first preconfigured number of consecutive RLM indications, each of which is either the OOS indication or the RLM-RS missing indication.

9. The UE of claim 8, wherein the at least one processor is further configured to execute the computer-executable instructions to:

stop the timer for radio link recovery by the higher layer after receiving a second preconfigured number of consecutive RLM indications, each of which is either the IS indication or the RLM-RS missing indication.

10. A method for radio link monitoring (RLM) performed by a user equipment (UE), the method comprising:

receiving, from a serving cell, an RLM configuration;

monitoring an RLM reference signal (RS) (RLM-RS) resource indicated by the RLM configuration to determine a first downlink (DL) radio link quality;

monitoring a backup RLM-RS resource that is associated with the RLM-RS resource to determine a second DL radio link quality after determining that the first DL radio link quality is lower than a first threshold and the RLM configuration also indicates the backup RLM-RS resource;

sending, via a physical (PHY) layer of the UE, an RLM indication to a higher layer of the UE based on at least one of the first DL radio link quality and the second DL radio link quality; and determining an indication time interval, wherein two successive RLM indications are separated by at least the indication time interval, and the indication time interval has different values depending on whether or not the RLM configuration also indicates the backup RLM-RS resource.

11. The method of claim 10, wherein the indication time interval is determined based on an interval between the RLM-RS resource and the backup RLM-RS resource when the RLM configuration also indicates the backup RLM-RS resource.

12. The method of claim 10, wherein the RLM configuration further indicates at least one of a periodicity of the backup RLM-RS resource and a timing offset of the backup RLM-RS resource.

13. The method of claim 10, wherein:

types of the RLM indication include an in-sync (IS) indication and an out-of-sync (OOS) indication, and the RLM configuration further indicates a second threshold associated with the IS indication and a third threshold associated with the OOS indication.

14. The method of claim 13, wherein:

the RLM indication is the IS indication when the first DL radio link quality is higher than the second threshold or the second DL radio link quality is higher than the second threshold, and the RLM indication is the OOS indication when both the first DL radio link quality and the second DL radio link quality are lower than the third threshold.

15. The method of claim 13, wherein:

the types of the RLM indication further include an RLM missing indication, and the RLM configuration further indicates a fourth threshold associated with the RLM missing indication.

16. The method of claim 15, wherein:

the RLM indication is the IS indication when the first DL radio link quality is higher than the second threshold, the RLM indication is the OOS indication when the first DL radio link quality is lower than the third threshold but higher than the fourth threshold, and the RLM indication is the RLM-RS missing indication when the first DL radio link quality is lower than the fourth threshold.

17. The method of claim 15, further comprising:

starting a timer for radio link recovery by the higher layer after receiving a first preconfigured number of consecutive RLM indications, each of which is either the OOS indication or the RLM-RS missing indication.

18. The method of claim 17, further comprising:

stopping the timer for radio link recovery by the higher layer after receiving a second preconfigured number of consecutive RLM indications, each of which is either the IS indication or the RLM-RS missing indication.

* * * * *